US009772871B2

(12) United States Patent
Razin

(10) Patent No.: US 9,772,871 B2
(45) Date of Patent: Sep. 26, 2017

(54) APPARATUS AND METHOD FOR LEVERAGING SEMI-SUPERVISED MACHINE LEARNING FOR SELF-ADJUSTING POLICIES IN MANAGEMENT OF A COMPUTER INFRASTRUCTURE

(71) Applicant: SIOS Technology Corporation, Lexington, SC (US)

(72) Inventor: Sergey A. Razin, Columbia, SC (US)

(73) Assignee: SIOS Technology Corporation, Lexington, SC (US)

( * ) Notice: Subject to any disclaimer, the term of this patent is extended or adjusted under 35 U.S.C. 154(b) by 0 days.

(21) Appl. No.: 14/806,071

(22) Filed: Jul. 22, 2015

(65) Prior Publication Data
US 2016/0026491 A1 Jan. 28, 2016

Related U.S. Application Data

(60) Provisional application No. 62/027,365, filed on Jul. 22, 2014.

(51) Int. Cl.
*G06F 9/455* (2006.01)
(52) U.S. Cl.
CPC ............... *G06F 9/45558* (2013.01); *G06F 2009/45591* (2013.01)
(58) Field of Classification Search
CPC .................................................. G06F 9/45558
See application file for complete search history.

(56) References Cited

U.S. PATENT DOCUMENTS

| 6,026,397 A | 2/2000 | Sheppard |
| 8,954,880 B1 | 2/2015 | Rabe et al. |
| 2004/0236738 A1 | 11/2004 | Thier et al. |
| 2006/0047655 A1 | 3/2006 | Peter |

(Continued)

OTHER PUBLICATIONS

Sugato Basu, Semi-supervised Clustering: Learning with Limited User Feedback, 2003, The University of Texas at Austin.*

(Continued)

*Primary Examiner* — Charlie Sun
(74) *Attorney, Agent, or Firm* — Duquette Law Group, LLC

(57) ABSTRACT

Embodiments relate to a method for managing and analyzing a computer environment. The method includes receiving, by the host device, a set of data elements from at least one computer environment resource of the computer infrastructure, each data element of the set of data elements relating to an attribute of the at least one computer environment resource. The method includes applying a system analysis function to the set of data elements to characterize a dataset specification associated with the set of data elements. The method includes receiving, by the host device, a user-selected policy threshold criterion based on the dataset specification and providing the user-selected policy threshold criterion to the semi-supervised learning algorithm as a parameter. The method includes adjusting a boundary of the dataset specification of the set of data elements, as associated with the user-selected policy threshold criterion, based on a behavioral change of the computer infrastructure.

32 Claims, 7 Drawing Sheets

(56) References Cited

U.S. PATENT DOCUMENTS

2012/0311154 A1* 12/2012 Morgan .............. H04L 12/6418
709/226
2014/0173623 A1* 6/2014 Chang .................. G06F 9/5088
718/105

OTHER PUBLICATIONS

Tan et al., Data Mining Cluster Analysis: Basic Concepts and Algorithms, 2004, University of Minnesota.*
Andrew Ng, CS229 Lecture notes, 2012, Stanford University.*
Ferreira Cordeiro, Robson Leonardo, et al. "Clustering very large multi-dimensional datasets with mapreduce." Proceedings of the 17th ACM SIGKDD international conference on Knowledge discovery and data mining. ACM, 2011.*
International Search Report dated Nov. 6, 2015 (Nov. 6, 2015) from corresponding International application No. PCT/US 15/41557.

* cited by examiner

APPARATUS AND METHOD FOR LEVERAGING SEMI-SUPERVISED MACHINE LEARNING FOR SELF-ADJUSTING POLICIES IN MANAGEMENT OF A COMPUTER INFRASTRUCTURE

RELATED APPLICATIONS

This patent application claims the benefit of U.S. Provisional Application No. 62/027,365, filed on Jul. 22, 2014, entitled, "Apparatus and Method for Leveraging Semi-Supervised Machine Learning for Self-Adjusting Policies in Management of a Compute Environment," the contents and teachings of which are hereby incorporated by reference in their entirety.

BACKGROUND

Enterprises utilize computer systems having a variety of components. For example, these conventional computer systems can include a computer infrastructure having one or more servers and one or more storage units interconnected by communication devices, such as switches or routers. The servers can be configured to execute one or more virtual machines (VMs) during operation. Each VM can be configured to execute or run one or more applications or workloads.

System administrators utilize conventional management and monitoring tools to control the performance and service levels associated with the computer infrastructure. However, with the introduction of virtualization and cloud services that constantly change due to workload and/or infrastructure changes, for example, on top of the computer infrastructure (i.e. commodity hardware), it can be difficult for a system administrator to control performance and service levels within the infrastructure.

SUMMARY

Traditional management and monitoring applications provide a system administrator with the ability to statically define, typically in relatively precise units of measure, a set of policies to monitor a computer infrastructure. In one arrangement, the systems administrator can set certain thresholds and policies which effectively guide the infrastructure's behavior under different circumstances.

For example, FIG. 1 illustrates a conventional management and monitoring application interface 100, such as provided on a display associated with a computer device. The interface 100 is configured to allow a system administrator to define an idle resource policy for a computer infrastructure (not shown). For example, the interface 100 provides a set of threshold identifiers 102 which allows the system administrator to identify particular thresholds associated with a particular policy, in this case idle resources in the computer infrastructure which effectively waste the infrastructure's capacity/resources. Also, the conventional interface 100 includes a set of threshold values 104 for the computer infrastructure at which certain optimizations can be considered, such as right-sizing (e.g., optimizing operability) of the VMs. In the example illustrated, for a CPU Utilization below threshold identifier 106, the systems administrator has adjusted the threshold value control 108 to select a utilization value of 20%. For an IO Utilization Below threshold identifier 110, the system administrator has adjusted the threshold value control 112 to a selected value of 100 Kbps. For a Network Bandwidth threshold identifier 114, the system administrator has adjusted a threshold value control 116 to select a value of 5 Mbps 116. In use, once the thresholds 102 and values 104 have been identified by the administrator, the administrator can enter into a particular grid (not shown) that provides information about the resources that have been identified by the computer device as idle (if any).

As indicated above, the conventional management application allows management and monitoring of a specific instance based upon static values, such as percentage of utilization or network bandwidth, selected by the system administrator. However, the management application executes under the assumption that the system administrator has a full understanding of the computer system's workload (e.g., where workload in this context is the application that can be broken down into multiple components as services and even servers), the system's behavior, needs, and/or requirements, and how such affects the infrastructure on top of which the workload operates. Such an understanding can be considered impractical.

For example, with the growing amounts of data utilized by a computer system, the workloads, and changes in the definition of a workload, it can be difficult for a system administrator to have a clear understanding of the workload, its requirements, and effects on a given infrastructure. With a lack of specific level of information, the use of administrator-selected, static values associated with particular system thresholds can result in inaccurate management and monitoring of the computer system.

Additionally, execution of the management application assumes that the computer system's environment/infrastructure (i.e., once policies are established), the size of the computer system, as well as the workload remain integral in order for the application to monitor and possibly maintain the established service levels. However, with the push toward virtualization and migration to the cloud, in order to satisfy businesses requirements that infrastructure be scalable, predictable, cheap, and agile, these assumptions are no longer valid.

In another example, as business needs for agility and dependence on the technology grows, which is successfully supported by virtualization and related technologies (i.e., ease of provisioning, charge back methods, etc.), the computer system can experience constant changes and deformations such as when as new workloads get added/provisioned, workload patterns changes, and/or updates applied. As the virtualization/cloud environments encounter substantially constant transformations, these transformations make static policies obsolete as soon as they are understood. For example, if there were a tool that could provide a comprehensive understanding of the workload through a converged view (i.e. compute, storage, network) to the system administrator, this understanding would be obsolete right after the analysis is performed (or even during). This is because the workload, as well as infrastructure underneath, is constantly experiencing changes and deformation such that the system administrator cannot realistically capture it all.

By contrast to conventional management and monitoring applications, embodiments of the present innovation relate to an apparatus and method for leveraging semi-supervised machine learning for self-adjusting policies in management of a computer infrastructure. In one arrangement, a host device is configured to obtain a comprehensive high-level overview of operational thresholds for various attributes, such as a compute attribute, a storage attribute, an application attribute or a network attribute, of the computer infrastructure. The host device is further configured to leverage a semi-supervised machine learning technique to adjust established thresholds and/or policies in a substantially continuous manner, as the computer infrastructure experiences transformations, based on the changes/deformations of the infrastructure and workload specifics.

In one arrangement, embodiments of the innovation relate to a method for managing a computer environment in a host device. The method includes receiving, by the host device, a set of data elements from at least one computer environment resource of the computer infrastructure, each data element of the set of data elements relating to an attribute of the at least one computer environment resource. The method includes applying, by the host device, a system analysis function to the set of data elements to characterize a dataset specification associated with the set of data elements. The method includes receiving, by the host device, a user-selected policy threshold criterion based on the dataset specification. The method includes adjusting, by the host device, a boundary of the dataset specification of the set of data elements, as associated with the user-selected policy threshold criterion, based on a behavioral change of the computer infrastructure.

In one arrangement, embodiments of the innovation relate to, in a host device, a method for managing a computer infrastructure via a graphical user interface (GUI). The method includes providing, by the host device and via the GUI, at least one policy criterion, the at least one policy criterion identifying at least one attribute of the computer infrastructure for monitoring by the host device. The method includes in response to receiving a selection of the at least one policy criterion, presenting, by the host device and via the GUI, a user-selected threshold criterion configured to allow selection of to select a dataset specification associated with the at least one attribute of the computer infrastructure. The method includes, in response to receiving a user-selected threshold criterion, providing, by the host device and via the GUI, an output notification related to a selected dataset specification associated with a computer environment resource.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

In relatively large infrastructure/cloud/virtualization environments, it is important for a system administrator to have insight and control over the resources that are being provisioned and used within a computer infrastructure. For example, if one or more virtual machines are no longer in use but are still running within the infrastructure, the virtual machines hold a set of relatively expensive resource that can be utilized by other active virtual machines and workloads. In environments with thousands of virtual machines and workloads, it can be difficult for the system administrator to identify such resources using conventional management applications, since the understanding of what is defined as idle is not clear.

Embodiments of the present innovation relate to a method and apparatus for identifying operational thresholds for various attributes of a computer infrastructure, such as a compute attribute, a storage attribute, an application attribute or a network attribute, of the computer infrastructure. The host device is further configured to leverage using semi-supervised machine learning to adjust established thresholds and/or policies in a substantially continuous manner, while allowing for self-adjustment of the thresholds as the workload/infrastructure changes over time (i.e., based on the changes/deformations of the infrastructure and workload specifics).

Figure 1:
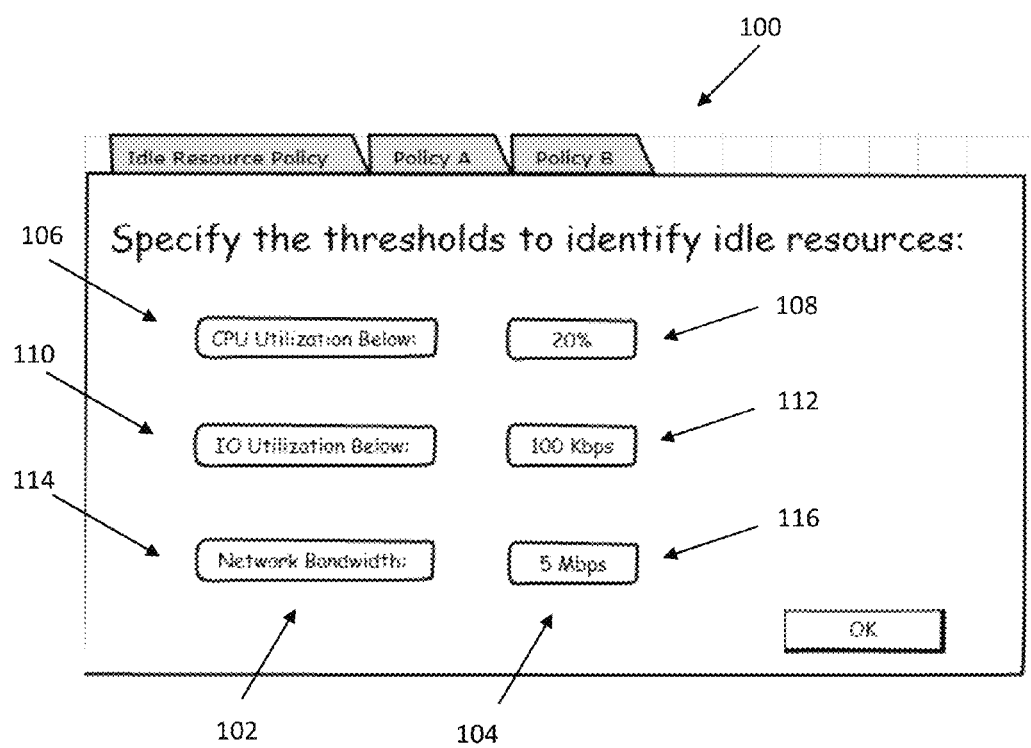
FIG. 1 illustrates a prior art management and monitoring application interface.
Figure 2:
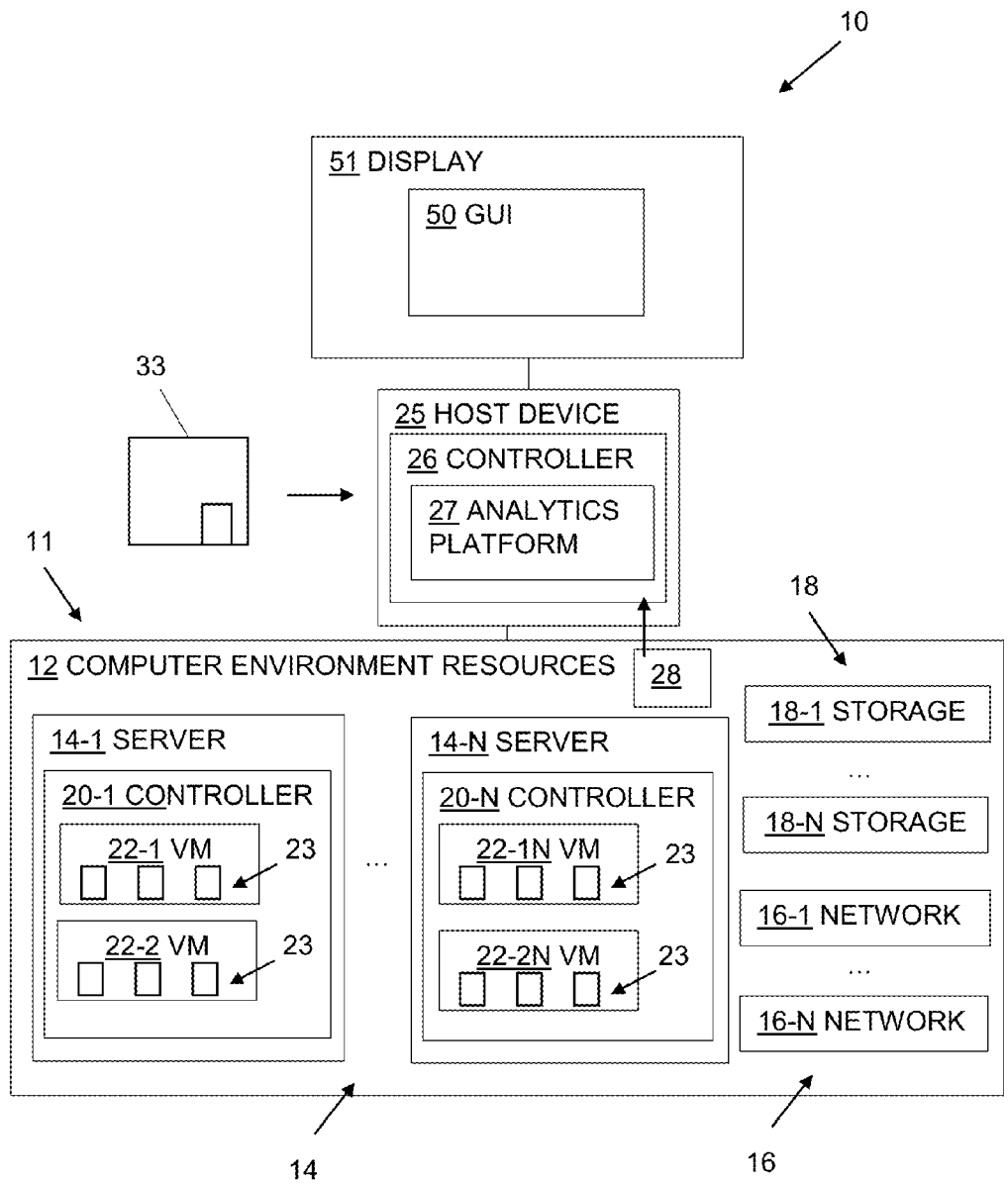
FIG. 2 illustrates a computer environment 10, according to one arrangement.

FIG. 2 illustrates an arrangement of a computer environment 10 which includes at least one computer infrastructure 11 disposed in electrical communication with a host device 25. While the computer infrastructure 11 can be configured in a variety of ways, in one arrangement, the computer infrastructure 11 includes a variety of computer environment resources 12. For example, the computer environment resources 12 can include one or more server devices 14, such as computerized devices, one or more communication devices 16, such as switches or routers, and one or more storage devices 18, such as disc drives or flash drives.

Each server device 14 can include a controller or compute hardware 20, such as a memory and processor. For example, server device 14-1 includes controller 20-1 while server device 14-N includes controller 20-N. Each controller 20 can be configured to execute one or more virtual machines 22 with each virtual machine 22 being further configured to execute or run one or more applications or workloads 23. For example, controller 20-1 can execute a first virtual machine 22-1 and a second virtual machine 22-2, each of which, in turn, is configured to execute one or more workloads 23. Each compute hardware element 20, storage device element 18, network communication device element 16, and application 23 relates to an attribute of the computer infrastructure 11.

In one arrangement, the host device 25 is configured as a computerized device having a controller 26, such as a memory and a processor. The host device 25 is disposed in electrical communication with the computer infrastructure 11 and with a display 51. The host device 25 is configured to receive, via a communications port (not shown), a set of data 28 elements from the computer environment resources 12 and to utilize semi-supervised machine learning techniques to obtain an understanding of a dataset specification associated with the various attributes of the computer infrastructure 11. For example, the host device 25 includes an analytics platform 47 that is configured to apply a semi-supervised learning technique (e.g., a system analysis function 40) to the received data elements 28 to obtain a dataset specification for the data elements 28. Further the host device 25 is configured to utilize semi-supervised machine learning techniques to recommend boundaries of the dataset specification and to self-adjust the established boundaries of the dataset specification as the attributes of the infrastructure 11 change over time.

The controller 26 of the host device 25 can store an application for managing the computer environment resources 12 in the computer system 10. The management application installs on the controller 26 from a computer program product 33. In some arrangements, the computer program product 33 is available in a standard off-the-shelf form such as a shrink wrap package (e.g., CD-ROMs, diskettes, tapes, etc.). In other arrangements, the computer program product 33 is available in a different form, such downloadable online media. When performed on the controller 26 of the host device 25, the management application causes the host device 25 to applying semi-supervised machine learning techniques to identify operational thresholds for various attributes of a computer infrastructure and to leverage semi-supervised machine learning techniques to adjust established thresholds and/or policies in a substantially continuous manner.

Figure 3:
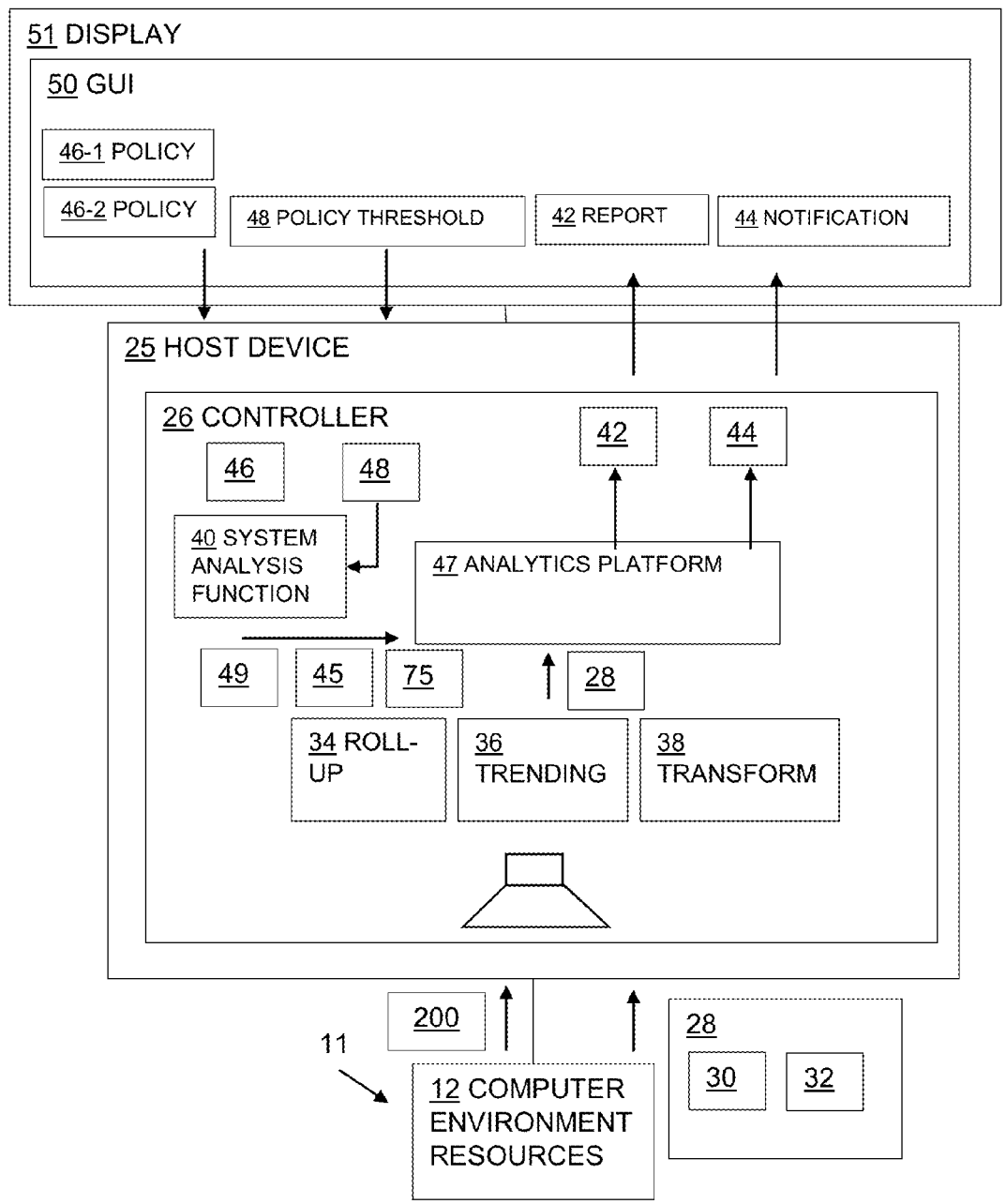
FIG. 3 illustrates a schematic representation of a host device of FIG. 1 processing data elements from a computer infrastructure, according to one arrangement.

With continued reference to FIG. 2 and with additional reference to FIG. 3, the following provides an example of the operation of the host device 25 utilizing semi-supervised learning techniques to define and adjust policies associated with the computer infrastructure.

Initially, the host device 25 is configured to receive a policy criterion 46 to define a policy to apply to the machine learning algorithm that analyzes the computer infrastructure 11. In one arrangement, a systems administrator or user can provide the policy criterion 46 to the host device 25 in order to configure the host device 25 to analyze particular attributes of the computer infrastructure 11. With reference to FIG. 3, the host device 25 is configured to provide a listing of policy criteria 46 via the graphical user interface 50 for review and selection by the system administrator. For example, a first policy criterion 46-1 can relate to the identification of idle workloads 23 executed by the virtual machines 22 within the computer infrastructure 11 while a second policy criterion 46-2 can relate to the identification of available storage within the storage devices 18 of the computer infrastructure 11. With such a configuration, the system administrator can use a mouse or a touch-enabled interface device such as a tablet, to select one of the policy criteria 46, in this case the first policy criterion 46-1, and transmit the selection to the host device 25.

Next, with continued reference to FIG. 3, the host device 25 is configured to receive a set of data elements 28 from at least one computer environment resource 12 of the computer infrastructure 11 where each data element 28 of the set of data elements relates to an attribute of the computer environment resources. In one arrangement, during operation, the host device 25 can stream the data elements 28 from the computer infrastructure 11, such as via public API calls, for data elements 28 relating to the compute level (compute attributes), the network level (network attributes), the storage level (storage attributes) and/or the application or workload level (application attributes) of the computer environment resources 12. For example, the host device 25 can receive data elements 28 that relate to the controller configuration and utilization of the servers devices 12 (i.e., compute attribute), the VM activity in each of the server devices 14 (i.e., application attribute) and the current state and historical data associated with the computer infrastructure 11.

Each data element 28 of the set of data elements can be configured in a variety of ways. In one arrangement, each data element 28 includes object data 30 and statistical data 32. The object data 30 can identify the related attribute of the originating computer environment resource 12. For example, the object data 30 can identify the data element 28 as being associated with a compute attribute, storage attribute, network attribute or application attribute of a corresponding computer environment resource 12. The statistical data 32 can specify a behavior associated with the at least one computer environment resource.

In one arrangement, the host device 25 is configured to poll the computer infrastructure 11 for data elements 28 that relate to a selected policy criteria 46. For example, with reference to the example provided above, assume the host device 25 is configured to define a policy based upon policy criterion 46-1 which relates to identifying the idle workloads 23 in the virtual machines 22 executed by the computer infrastructure 11. In such a case, the host device 25 polls the computer environment resources 12 to retrieve data elements 28 that identify idle workloads 23 executed by the virtual machines 22 and retrieves objects or data associated with these idle workloads 23. With such a configuration, while the idle workload objects can be configured in a variety of ways, in one arrangement, each object for each workload can include information relating to the average CPU utilization, the average IO utilization, and the average network utilization for that workload 23.

In one arrangement, the host device 25 is configured to direct the received data elements 28 to a platform 27 for processing. The platform 27 can be configured to process the data elements 28 in a variety of ways. For example, any number of the computer environment resources 12 can provide the data elements 28 to the host device 25 in a proprietary format. In such a case, the platform 27 of the host device 25 is configured to normalize the data elements 28 using a normalization or roll-up function 34 such that the data elements 28 can be further process and/or presented to the end user in a non-normalized manner. In another example, as the host device 25 receives data elements 28 over time, the data elements 28 can include varying information regarding each of the storage devices 18 or network devices 16. In such a case, the platform 27 of the host device 25 is configured to average the data elements 28 using a trending or averaging function 36. In another example, as the host device 25 receives data elements 28 over time, the data elements 28 can be presented in a variety of formats. For example, for data elements 28 received from multiple network devices 16 of the computer infrastructure 11, the speed of the devices 16 can be presented in seconds (s) or milliseconds (ms). In such a case, the platform 27 of the host device 25 is configured to format the data elements using a transforming or formatting function 38.

Next, the host device 25 is configured to apply a semi-supervised machine learning technique to the received data elements 28 to obtain a dataset specification for the data elements 28.

Conventional machine learning techniques include supervised learning in which a host device infers a dataset specification or function from a labeled training dataset which includes a set of training examples. In conventional supervised learning, each training example is configured as a pair of values which includes an input object (e.g., typically a vector) and a desired output value, termed a supervisory signal. In use, a host device typically executes a supervised learning algorithm to analyze the training dataset and to produce an inferred function, which can be used for mapping new examples. An optimal scenario will allow for the algorithm to correctly determine class labels for unseen instances. This requires the learning algorithm to generalize data from the training data to unseen situations in a relatively reasonable way. However, the acquisition of labeled training dataset often requires a skilled human agent. As a result, the cost associated with the labeling process may render a fully labeled training set infeasible.

In order to minimize, or avoid, the expense of human agent constantly monitoring, analyzing, and providing the labeled dataset, the host device 25 is configured to utilize semi-supervised learning techniques to monitor and manage the various attributes of the computer infrastructure 11. Semi-supervised learning relates to a class of supervised learning techniques that utilizes a relatively small amount of labeled data with a relatively large amount of unlabeled data for training. As a result, semi-supervised learning can produce an improvement in learning accuracy. Semi-supervised learning falls between unsupervised learning, which does not include labeled training data, and supervised learning, which includes completely labeled training data.

In one arrangement when applying the semi-supervised learning technique, an analytics platform 47 of the host device 25 applies a system analysis function 40 to the set of data elements 28 to characterize a dataset specification associated with the set of data elements 28. The system analysis function 40 can be configured in a variety of ways. For example, the system analysis function 40 host device 25 can be configured as a clustering function 45.

Clustering is the task of data classification in such a way that the data elements 28 in the same group, called a cluster, are more similar to each other than to the objects in other groups or clusters based on different characteristics. Clustering is a conventional technique for statistical data analysis, used in many fields, including machine learning, pattern recognition, image analysis, information retrieval, and bioinformatics. The grouping of objects into clusters can be achieved by various algorithms that differ significantly in the definition of what constitutes a cluster and how to efficiently find them. For example, known clustering algorithms include hierarchical clustering, centroid-based clustering (i.e., K-Means Clustering), distribution based clustering, and density based clustering.

During operation, the analytics platform 47 applies the clustering function 45 to each data element 28 of the set of data elements to define a set of clusters 35. In one arrangement, the host device 25 utilizes the clustering function 45 to detect the presence of waste associated with the attributes of the computer infrastructure 11.

Figure 4:
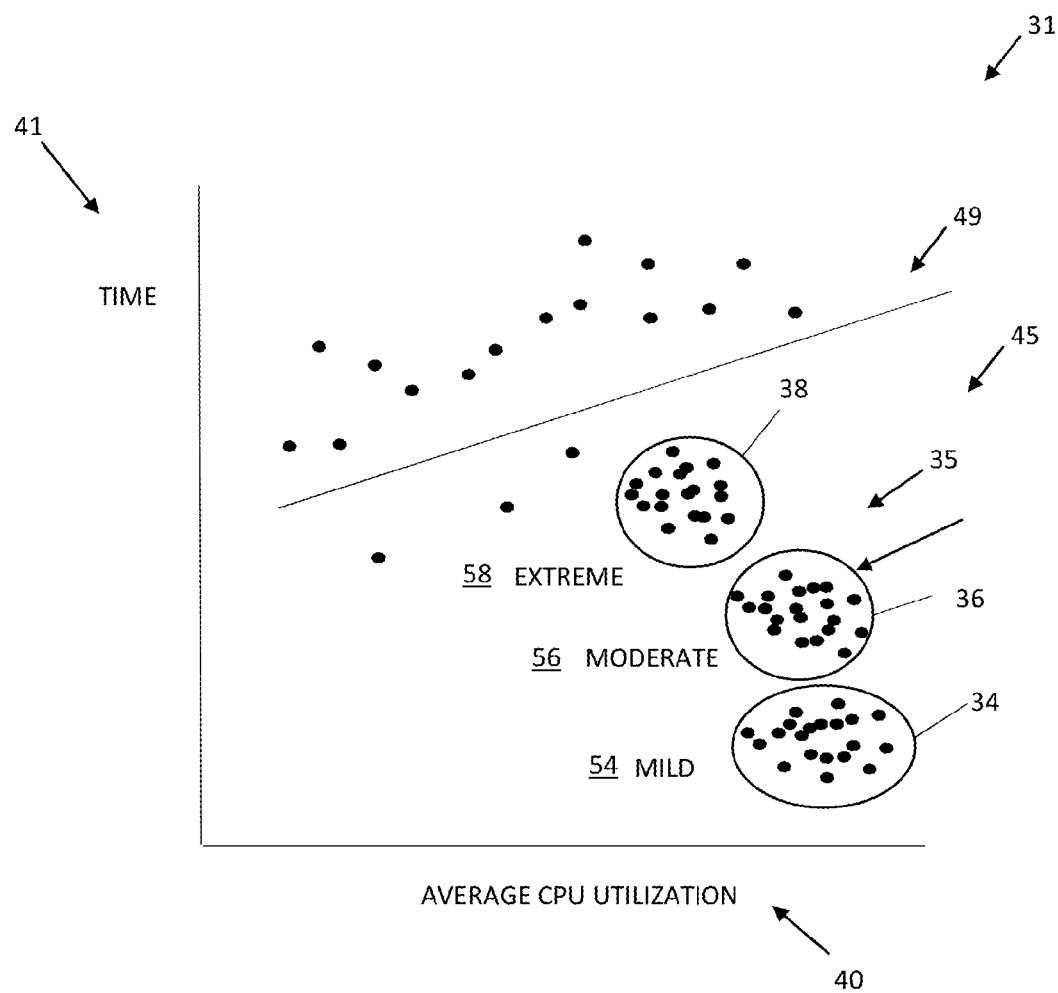
FIG. 4 illustrates application of a system analysis function to a set of data elements by leveraging a statistical classification algorithm as provided by a host device of FIG. 2, according to one arrangement.

For example, with respect to the scenario provided above, and as part of the clustering process, the analytics platform 47 of the host device 25 is configured to apply a clustering function 45 to the idle workload data elements 28 (i.e., idle workload objects 30 and statistical data 32) in order to associate particular data elements 28 into groups or clusters. For example, with particular reference to FIG. 4, the host device 25 applies the clustering function 45 to identify groups of idle workload data elements 28 (e.g., objects) based upon the average CPU utilization 40 over time 41. As shown in the graph 31, based upon the application of the clustering function 45 to the idle workload data elements 28, the host device 25 has identified three different sets of workloads that are idle: a first cluster grouping 34, a second cluster grouping 36, and a third cluster grouping 38, where each cluster includes a given number of identified, idle workloads.

It should be noted that while the host device 25 applies the clustering function 45 to a single attribute (i.e., based upon average CPU utilization), this description is by way of example, only. In one arrangement, the host device 25 can apply the clustering function to other attributes (e.g., average IO utilization, average network utilization, etc.).

Once the analytics platform 47 of the host device 25 has identified the set of clusters 35, the analytics platform 47 is configured to assign a dataset specification or characteristic to each cluster of the set of clusters 35. For example, assume the case where the first cluster 34 includes 10/1000 idle workloads at a first average CPU utilization level, the second cluster 36 includes 50/1000 idle workloads at a second average CPU utilization level, and the third cluster 38 includes 100/1000 idle workloads at a third average CPU utilization level. In such a case, the host device 25 can associate each cluster 34, 36, 38 with a particular idle workload dataset specification level. For example, for the first cluster 34 having a relatively low CPU utilization, the host device 25 can assign a conservative or mild idle workload specification level 54 to the cluster 34. For the second cluster 36 having a moderate CPU utilization, the host device 25 can assign a moderate idle workload specification level 56 to the cluster 36. For the third cluster 38 having a relatively high CPU utilization, the host device 25 can assign an extreme idle workload specification level 58 to the cluster 38. In one arrangement, the mild/moderate/extreme workload specification levels relate to the behavior or characteristics of how a user (e.g., the system administrator) is planning to utilize the information to identify, and possibly act on, the identified data elements 28 in a given cluster.

Next, the host device 25 is configured to receive a user-selected policy threshold criterion 48 based on the assigned dataset specification. In one arrangement, the host device 25 is configured to provide an end user or system administrator with the opportunity to select a particular specification level for analysis.

Figure 5:
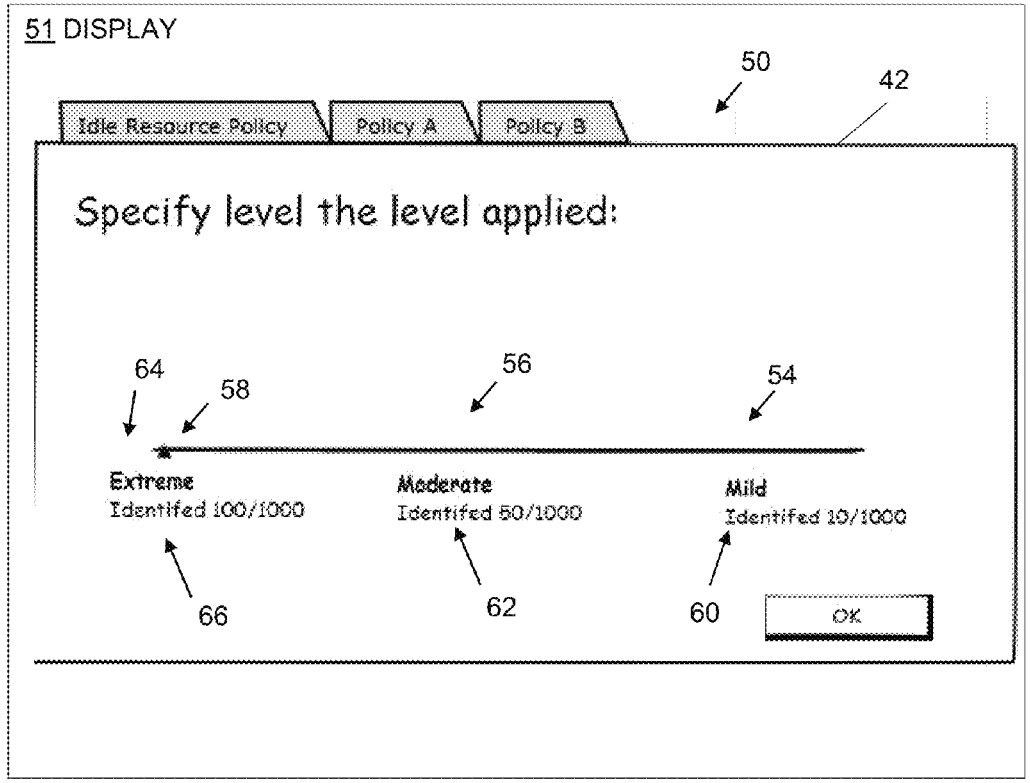
FIG. 5 illustrates a graphical user interface as provided by the host device of FIG. 2, according to one arrangement.
Figure 6:
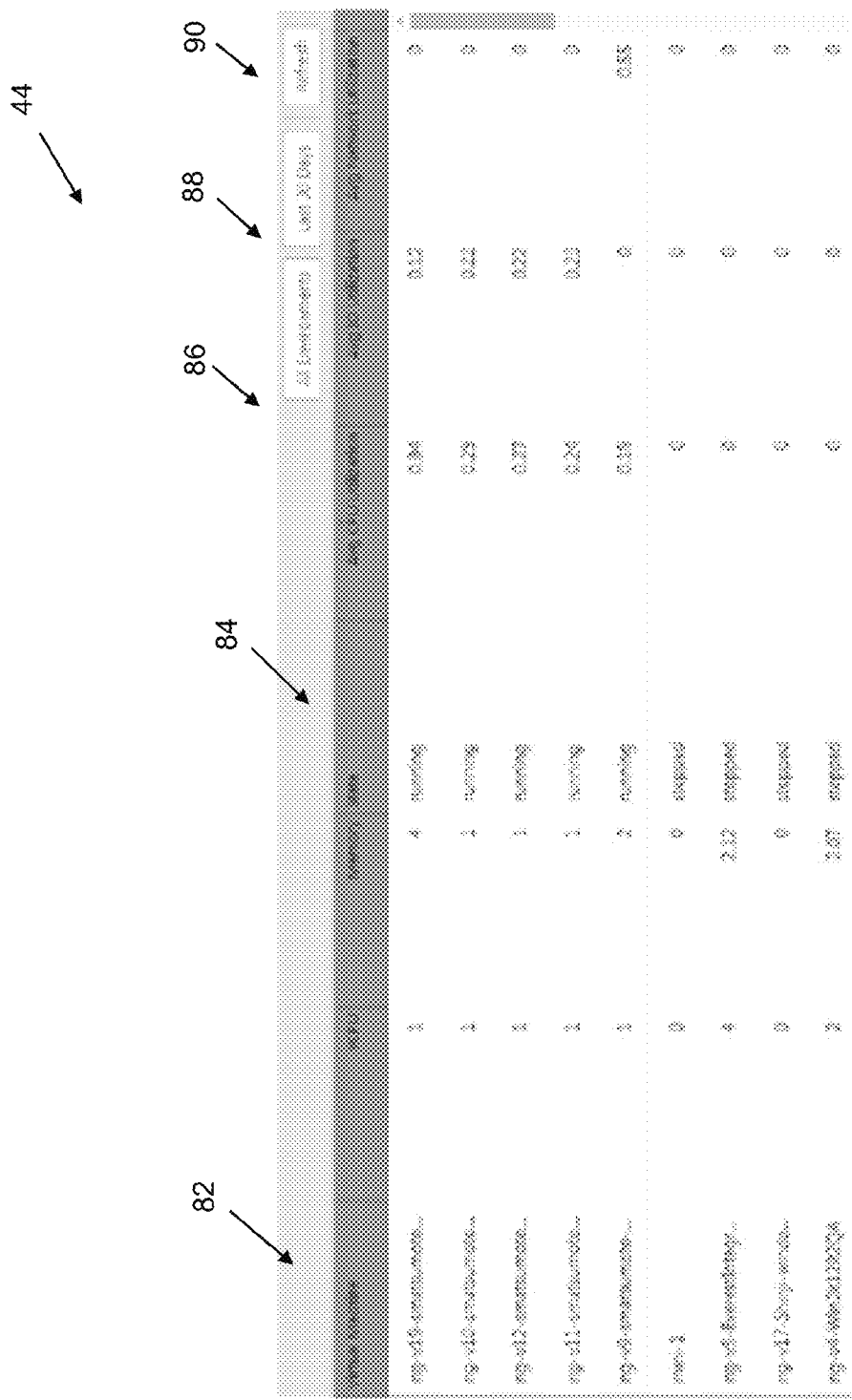
FIG. 6 illustrates an output notification generated by the host device, according to one arrangement.

For example, with reference to FIGS. 3 and 5, the analytics platform 47 of the host device 25 provides an insight report 42 to the graphical user interface 50 which identifies the effects of a particular policy on identification of particular attributes of the computer environment resources 12. As indicated above, the host device 25 has assigned an idle workload specification level (e.g., mild 54, moderate 56, and extreme 58) to each cluster 34, 36, and 38. As illustrated, the host device 25 can display the insight report 42 to a systems administrator as part of the GUI 50 via a display 51. The insight report 42 identifies the idle workload dataset specifications 54, 56, 58 (e.g., mild, moderate, or extreme) of the computer environment resources 12, as well as the idle workload threshold levels or criteria 60, 62, 64 (e.g., 10/1000, 50/1000, and 100/1000) associated with each idle workload specification 54, 56, 58.

The insight report 42, as provided by the GUI 50, allows the system administrator to select a dataset specification, in this case an idle workload dataset specification (e.g., mild, moderate, or extreme) via a cursor 66. For example, assume the case where the system administrator wants to obtain information about all of the idle workloads in the computer infrastructure 11 having an average CPU utilization that is close to zero. In such a case, the system administrator can use a mouse or a touch-enabled interface device such as a tablet, to select the moderate idle workload threshold level 62 using the cursor 66. In response to the selection, the GUI 50 provides this selection to the host device 25 as a user-selected policy threshold criterion 48. In one arrangement, the user-selected threshold criterion 48 is provided by the GUI 50 as a percentage of a total number of data elements 28 identified for each cluster. For example, selection of the moderate idle workload specification 56 by the system administrator causes the GUI 50 to generate a user-selected policy threshold criterion 48 that requests the identification of 5% of idle workloads across the computer infrastructure 11.

With reference to FIG. 2, once the host device 25 receives the user-selected threshold criterion 48, the host device 25 applies the user-selected threshold criterion 48 to the system analysis function 40, such as the clustering function 45, to generate a semi-supervised function. For example, the user-selected threshold criterion 48 provides information to the system analysis function 40, based upon the user's selected dataset specification, to adjust the way in which the system analysis function 40 operates. For example, assume the case where the user-selected policy threshold criterion 48 requests the identification of 5% of idle workloads across the computer infrastructure 11. Application of the criterion 48 into the clustering function 45 by the host device 25 generates a semi-supervised function 75. The semi-supervised function 75 configures the host device 25 to analyze the cluster associated with the criterion 48 to adjust a boundary of the dataset specification of the set of data elements, as associated with the user-selected policy threshold criterion 48, based on a behavioral change of the computer infrastructure 11 (i.e., as characteristics of the computer environment resources 12 of the computer infrastructure 11 change over time).

For example, assume the system administrator has selected the moderate idle workload threshold level 62 as the user-selected threshold criterion 48. Based upon this selection, the host device 25 provides the criterion 48 to the clustering function 45 to generate the associated semi-supervised function 75. Execution of the semi-supervised function 75 configures the host device 25 to analyze the computer infrastructure 11 for data elements 28 that relate to the moderate cluster 36, as identified in FIG. 4. For example, based upon an increase or a decrease in the number of moderate idle workloads within the computer infrastructure 11, the host device 25 can expand or contract the boundary of the cluster element 36.

For example, with additional reference to FIG. 3, during operation and over time, the host device 25 is configured to receive updated data elements 200 from the computer infrastructure 11 on a substantially continuous basis. These updated data element 200 relating to a behavioral change of a particular attribute of the computer environment resources 12. For example, in the present example, the updated data elements 200 relate to an increase or a decrease in the number of moderate idle workloads within the computer infrastructure 11.

In response, the host device 25 is configured to analyze the updated data elements 200 in real time in order to adjust the boundary of the cluster 36 to meet the user (e.g., as based upon the user-selected policy threshold criterion 48). For example, as the host device 25 receives the updated data elements 200 (e.g., objects and statistical data), the population of the moderate cluster 36 can change with either the addition of new objects or the deletion of existing objects, as well as changes in the workload characteristics that are being continuously analyzed and adjusted based on the clustering technique. In either case, the average idle workload (CPU utilization) for the moderate cluster 36 can change. Based upon the changes to the cluster 36, the host device 25 is configured to automatically adjust (i.e., expand or contract) a boundary of the cluster 36, such as the average CPU utilization value range, to account for changes to attributes of the system 10 which includes, but is not limited to, changes such as the addition of new virtual machines and workload as well as behavioral changes to the existing workloads. Accordingly, the host device 25 is configured to self-adjust the boundaries or definition of a moderate cluster 36 as the workload and/or infrastructure goes through changes/deformations, while maintaining the established threshold 48 that defines the cluster 36.

In one arrangement, the host device 25 is configured to provide an output notification 44 to the system administrator via the GUI. The output notification 44 provides high-level information related to a selected dataset specification as associated with a computer environment resource 12. For example, as provided above, the selected policy criterion 46 relates to the identification of idle workloads 23 executed by the virtual machines 22 within the computer infrastructure 11 and the selected dataset specification relates to a moderate idle workload specification level 55. Accordingly, the output notification 44 can provide a listing of virtual machines 82 and the state of each virtual machine 84. The output notification 44 can also provide the system administrator with the ability to correlate and explore the information and to make decisions regarding the system management, such as whether or not to delete certain virtual machines in this case.

Further, in one arrangement, the host device 25 can provide the output notification 44 to notify the system administrator that a boundary adjustment for a selected specification level is being implemented, as well as to report the changes.

Based upon the aforementioned configuration, the host device 25 can obtain information about a given dataset, such as idle workloads, without relying on preset policies that are defined by explicit thresholds usually specified in the units of measure (e.g., CPU %, IOPs, etc.). Instead, the host device 25 is configured to identify the set of resources (e.g., idle workloads or idle virtual machines) in the infrastructure using the semi-supervised analysis. As part of the semi-supervised analysis, such as through a process of clustering, the host device 25 obtains specification for the resources. The host device 25 is also configured to leverage the machine learning techniques (e.g., such as clustering) to continuously adjust the high-level boundaries of the specification in order to provide a system administrator with insight into the constantly changing characteristics of the workload and infrastructure dataset. Accordingly, the host device 25 has the ability to self-adjust boundaries of a specification as the workload and/or infrastructure goes through changes/deformations. As a result, the configuration of the host device 25 improves the overall ability for the system administrator to react to, and manage, the constantly changing characteristics of the infrastructure and workload.

As described above, the analytics platform 47 of the host device 25 is configured to utilize a system analysis function 40, such as a clustering function 45, as a semi-supervised machine learning technique. The system analysis function 40 can be configured in a variety of ways. For example, with reference to FIG. 3 the system analysis function 40 can be configured as a linear regression function 49. The analytics platform 47 of the host device 25 is configured to apply the linear regression function 49 to a set of data elements 28 to define a dataset specification.

For example, assume the case where a system administrator wants to know when the storage devices 18 of the computer infrastructure 11 will run out of space. By providing this as a policy criterion 46-2 to the host device 25, the host device 25, in turn, can select the linear regression function 49 to apply to data elements 28 received from the computer infrastructure 11. With an application of the linear regression function 49, the host device 25 can provide the system administrator with the timeframe associated with the unavailability of storage space within the infrastructure. Further, following the application of the linear regression function 49 to the data elements 28, the host device 25 is configured to provide the system administrator with the ability to set a threshold level of the associated dataset specification (e.g., mild, moderate, extreme) associated with the regression analysis. Additionally, the host device 25 is configured to monitor incoming data elements 200 to identify changes in the computer infrastructure and to adjust the linear regression based upon the detected changes.

As indicated above, the clustering function 45 is configured as a single-dimensional clustering function. Accordingly, when executed by the host device 25, the host device 25 is configured to apply the clustering function 45 to a single attribute, such as based upon average CPU utilization. Such indication is by way of example, only. In one arrangement, rather than clustering each attribute of the infrastructure individually, the clustering function 45 is configured as a multi-dimensional clustering function which allows the host device 25 to define clusters across multiple attributes of the infrastructure 11.

Figure 7:
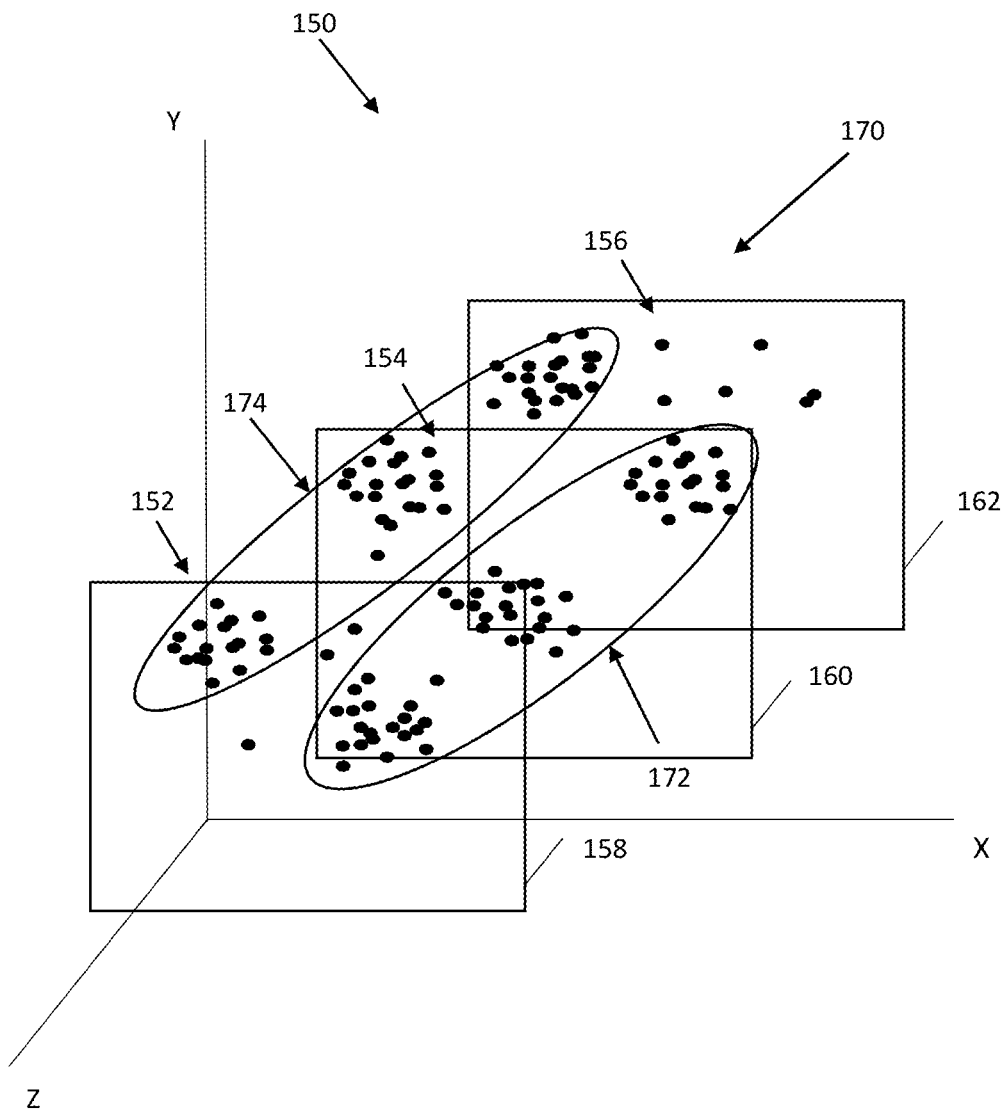
FIG. 7 illustrates application of a multi-dimensional clustering function to a set of data elements by leveraging a statistical classification algorithm as provided by a host device of FIG. 2, according to one arrangement.

For example, FIG. 7 illustrates a graph 150 showing data elements associated with the of the computer infrastructure 11. As shown, the data elements are related to CPU utilization 152 that are located in a first plane 158 relative to a z-axis 151 of a Cartesian coordinate system, a set of data elements related to disk utilization 154 that are located in a second plane 160 relative to the z-axis 151, and a set of data elements related to network utilization 156 that are located in a third plane 162 relative to the z-axis 151. With the clustering function 45 configured as a multi-dimensional clustering function 170, the host device 25 is configured to perform clustering across a combination of attributes (e.g., CPU utilization, IO (disc) utilization, and network utilization) in three dimensions. For example, with application of the multi-dimensional clustering function 170 to the CPU utilization, IO utilization, and network utilization data elements, the host device 25 has identified a first and second multi-dimensional cluster 172, 174 associated with the computer infrastructure 11.

As a result of the application of the multi-dimensional clustering function 170, in one arrangement, the host device 25 is configured to provide notification regarding the multi-dimensional clustering as part of the output notification 44 to the system administrator via the GUI. As indicated above, the output notification 44 provides high-level information related to a selected dataset specification as associated with a computer environment resource 12. For example, based upon the application of the multi-dimensional clustering function 170, the output notification 44 provides a list of idle resources (VMs) across all planes 158, 160, 162 (i.e., CPU, IO, and network utilization) along with the average CPU utilization for each virtual machine 86, the average IO utilization for each machine 88, and the average network utilization for each virtual machine 90. During the process of identifying idle VMs, it is not sufficient to take only CPU utilization into considerations since some workloads may appear idle at the CPU level but active at the network level.

As a result, the method of multi-dimensional classifications (e.g., as clustering) addresses this challenge as part of this innovation.

While various embodiments of the innovation have been particularly shown and described, it will be understood by those skilled in the art that various changes in form and details may be made therein without departing from the spirit and scope of the innovation as defined by the appended claims.

What is claimed is:

1. In a host device, a method comprising:
receiving, by the host device, a set of data elements from at least one computer environment resource of a computer infrastructure, each data element of the set of data elements relating to an attribute of the at least one computer environment resource;
applying, by the host device, a system analysis function to the set of data elements to characterize at least one dataset specification associated with the set of data elements;
receiving, by the host device, a user-selected policy threshold criterion identifying a dataset specification of the at least one dataset specification for analysis; and
in response to the receiving the user-selected policy threshold criterion, adjusting, by the host device, a boundary of the identified dataset specification based on the received user-selected policy threshold criterion and a behavioral change of the computer infrastructure, thereby managing attributes of the computer infrastructure.

2. The method of claim 1, wherein each data element of the set of data elements comprises object data configured to identify the attribute of the at least one computer environment resource and statistical data configured to specify a behavior associated with the at least one computer environment resource.

3. The method of claim 1, wherein the attribute comprises at least one of a compute attribute, a storage attribute, an application attribute, and a network attribute.

4. The method of claim 1, further comprising:
receiving, by the host device, a policy criterion; and
wherein the receiving the set of data elements from the at least one computer environment resource of the computer infrastructure comprises receiving, by the host device, the set of data elements from the at least one computer environment resource of the computer infrastructure, each data element of the set of data elements relating to the attribute of the at least one computer environment resource associated with the policy criterion.

5. The method of claim 1, wherein the applying the system analysis function to the set of data elements to characterize the at least one dataset specification associated with the set of data elements comprises:
applying, by the host device, a clustering function to the each data element of the set of data elements to define a set of clusters; and
providing, by the host device, an assigned dataset specification to each cluster of the set of clusters.

6. The method of claim 5, wherein the applying the clustering function to the each data element of the set of data elements to define the set of clusters comprises applying, by the host device, a multi-dimensional clustering function to the each data element of the set of data elements to define the set of clusters.

7. The method of claim 5, wherein the receiving the user-selected policy threshold criterion identifying the dataset specification of the at least one dataset specification further comprises applying, by the host device, the user-selected policy threshold to the system analysis function to generate a semi-supervised function.

8. The method of claim 7, comprising applying, by the host device, the semi-supervised function to the set of data elements associated with the user-selected policy threshold criterion to adjust the boundary of the identified dataset specification of the set of data elements.

9. The method of claim 5, wherein the receiving the user-selected policy threshold criterion identifying the dataset specification of the at least one dataset specification comprises:
   displaying, by the host device and via a graphical user interface, the assigned dataset specification for the each cluster of the set of clusters, each assigned dataset specification associated with a policy threshold criterion; and
   receiving, by the host device, the user-selected policy threshold criterion identifying the dataset specification of the at least one dataset specification based on a user-selected dataset specification.

10. The method of claim 9, wherein the displaying the assigned dataset specification for the each cluster of the set clusters, the each assigned dataset specification associated with the policy threshold criterion comprises displaying, by the host device and via a graphical user interface, an assigned dataset specification for each cluster of a set of multi-dimensional clusters.

11. The method of claim 9, wherein the adjusting the boundary of the identified dataset specification of the set of data elements, provided by the user-selected policy threshold criterion, based on the received user-selected policy threshold criterion and the behavioral change of the computer infrastructure comprises adjusting, by the host device, a boundary of the cluster elements, as associated with the user-selected policy threshold criterion, based on the behavioral change of the computer infrastructure.

12. The method of claim 1, wherein the applying the system analysis function to the set of data elements to characterize the at least one dataset specification associated with the set of data elements comprises:
   applying, by the host device, a linear regression function to the set of data elements to define the at least one dataset specification associated with the set of data elements.

13. The method of claim 1, wherein the adjusting the boundary of the identified dataset specification of the set of data elements comprises:
   receiving, by the host device, updated data elements from the at least one computer environment resource of the computer infrastructure, each updated data element of the set of data elements relating to a behavioral change of the attribute of the at least one computer environment resource; and
   in response to the receiving the updated data elements, adjusting, by the host device, the boundary of the identified dataset specification of the set of data elements, as provided by the user-selected policy threshold criterion.

14. The method of claim 1, further comprising providing, by the host device, an output notification as part of a graphical user interface, the output notification configured to provide information associated with the identified dataset specification of the at least one computer environment resource.

15. A host device, comprising:
   a controller comprising a memory and a processor, the controller configured to:
      receive a set of data elements from at least one computer environment resource of a computer infrastructure, each data element of the set of data elements relating to an attribute of the at least one computer environment resource;
      apply a system analysis function to the set of data elements to characterize at least one dataset specification associated with the set of data elements;
      receive a user-selected policy threshold criterion identifying a dataset specification of the at least one dataset specification for analysis; and
      in response to the receiving the user-selected policy threshold criterion, adjust a boundary of the dataset specification of the identified set of data elements based on the received user-selected policy threshold criterion and a behavioral change of the computer infrastructure, thereby managing attributes of the computer infrastructure.

16. The host device of claim 15, wherein each data element of the set of data elements comprises object data configured to identify the attribute of the at least one computer environment resource and statistical data configured to specify a behavior associated with the at least one computer environment resource.

17. The host device of claim 15, wherein the attribute comprises at least one of a compute attribute, a storage attribute, an application attribute, and a network attribute.

18. The host device of claim 15, wherein the controller is further configured to:
   receive a policy criterion; and
   receive the set of data elements from the at least one computer environment resource of the computer infrastructure comprises the controller being configured to receive the set of data elements from the at least one computer environment resource of the computer infrastructure, each data element of the set of data elements relating to the attribute of the at least one computer environment resource associated with the policy criterion.

19. The host device of claim 15, wherein the controller configured to apply the system analysis function to the set of data elements to characterize the at least one dataset specification associated with the set of data elements comprises the controller being configured to:
   apply a clustering function to the each data element of the set of data elements to define a set of clusters; and
   provide an assigned dataset specification to each cluster of the set of clusters.

20. The host device of claim 19, wherein the controller configured to apply the clustering function to the each data element of the set of data elements to define the set of clusters comprises the controller being configured to apply a multi-dimensional clustering function to the each data element of the set of data elements to define the set of clusters.

21. The host device of claim 19, wherein the controller configured to receive the user-selected policy threshold criterion identifying the dataset specification of the at least one dataset specification comprises the controller being configured to:
   display, via a graphical user interface, the assigned dataset specification for each cluster of the set of clusters, each assigned dataset specification associated with a policy threshold criterion; and receive the user-selected policy threshold criterion identifying the dataset specification of the at least one dataset specification for analysis based on a user-selected dataset specification.

22. The host device of claim 21, wherein the controller configured to display the assigned dataset specification for the each cluster of the set clusters, the each assigned dataset specification associated with the policy threshold criterion, comprises the controller being configured to display, via the graphical user interface, the assigned dataset specification for each cluster of a set of multi-dimensional clusters.

23. The host device of claim 19, wherein the controller configured to receive the user-selected policy threshold criterion identifying the dataset specification of the at least one dataset specification comprises the controller being further configured to apply the user-selected policy threshold to the system analysis function to generate a semi-supervised function.

24. The host device of claim 23, wherein the controller is configured to apply the semi-supervised function to the set of data elements associated with the user-selected policy threshold criterion to adjust the boundary of the identified dataset specification of the set of data elements.

25. The host device of claim 21, wherein the controller configured to adjust the boundary of the identified dataset specification of the set of data elements comprises the controller being configured to adjust a boundary of the cluster elements, as associated with the user-selected policy threshold criterion, based on the behavioral change of the computer infrastructure.

26. The host device of claim 15, wherein the controller configured to apply the system analysis function to the set of data elements to characterize the at least one dataset specification associated with the set of data elements comprises the controller being configured to:
apply a linear regression function to the set of data elements to define the at least one dataset specification associated with the set of data elements.

27. The host device of claim 15, wherein the controller configured to adjust the boundary of the identified dataset specification of the set of data elements comprises the controller being configured to:
receive updated data elements from the at least one computer environment resource of the computer infrastructure, each updated data element of the set of data elements relating to a behavioral change of the attribute of the at least one computer environment resource; and
in response to receiving the updated data elements, adjust the boundary of the identified dataset specification of the set of data elements, as provided by the user-selected policy threshold criterion.

28. The host device of claim 15, wherein the controller is further configured to provide an output notification as part of a graphical user interface, the output notification configured to provide information associated with the identified dataset specification of the at least one computer environment resource.

29. In a host device, a method for managing a computer infrastructure, comprising:
receiving, by the host device, a set of data elements from at least one computer environment resource of the computer infrastructure, each data element of the set of data elements relating to an attribute of the at least one computer environment resource;
applying, by the host device, a system analysis function to the set of data elements to characterize a dataset specification associated with the set of data elements;
receiving, by the host device, a user-selected policy threshold criterion based on the dataset specification; and
adjusting, by the host device, a boundary of the dataset specification of the set of data elements, as associated with the user-selected policy threshold criterion, based on a behavioral change of the computer infrastructure;
wherein applying the system analysis function to the set of data elements to characterize the dataset specification associated with the set of data elements comprises:
applying, by the host device, a clustering function to the each data element of the set of data elements to define a set of clusters, and
assigning, by the host device, a given dataset specification to each cluster of the set of clusters;
wherein receiving the user-selected policy threshold criterion based on the dataset specification further comprises applying, by the host device, the user-selected policy threshold to the system analysis function to generate a semi-supervised function; and wherein adjusting a boundary of the dataset specification of the set of data elements comprises applying, by the host device, the semi-supervised function to the set of data elements associated with the user-selected policy threshold criterion to adjust the boundary of the dataset specification of the set of data elements, thereby managing attributes of the computer infrastructure.

30. In a host device, a method for managing a computer infrastructure, comprising:
receiving, by the host device, a set of data elements from at least one computer environment resource of the computer infrastructure, each data element of the set of data elements relating to an attribute of the at least one computer environment resource;
applying, by the host device, a system analysis function to the set of data elements to characterize a dataset specification associated with the set of data elements;
receiving, by the host device, a user-selected policy threshold criterion based on the dataset specification; and
adjusting, by the host device, a boundary of the dataset specification of the set of data elements, as associated with the user-selected policy threshold criterion, based on a behavioral change of the computer infrastructure, thereby managing attributes of the computer infrastructure;
wherein applying the system analysis function to the set of data elements to characterize the dataset specification associated with the set of data elements comprises:
applying, by the host device, a clustering function to the each data element of the set of data elements to define a set of clusters, and
assigning, by the host device, a given dataset specification to each cluster of the set of clusters; and
wherein receiving the user-selected policy threshold criterion based on the given dataset specification comprises:
displaying, by the host device and via a graphical user interface, the given dataset specification for the each cluster of the set of clusters; and
receiving, by the host device, the user-selected policy threshold criterion based on a user-selected dataset specification.

31. A host device, comprising:
a controller comprising a memory and a processor, the controller configured to:

receive a set of data elements from at least one computer environment resource of a computer infrastructure, each data element of the set of data elements relating to an attribute of the at least one computer environment resource;

apply a system analysis function to the set of data elements to characterize a dataset specification associated with the set of data elements;

receive a user-selected policy threshold criterion based on the dataset specification; and adjust a boundary of the dataset specification of the set of data elements, as associated with the user-selected policy threshold criterion, based on a behavioral change of the computer infrastructure, thereby managing attributes of the computer infrastructure;

wherein the controller configured to apply the system analysis function to the set of data elements to characterize the dataset specification associated with the set of data elements comprises the controller being configured to:

apply a clustering function to the each data element of the set of data elements to define a set of clusters, and assign a given dataset specification to each cluster of the set of clusters;

wherein the controller configured to receive the user-selected policy threshold criterion based on the dataset specification comprises the controller being further configured to apply the user-selected policy threshold to the system analysis function to generate a semi-supervised function; and wherein the controller configured to adjust a boundary of the dataset specification of the set of data elements comprises the controller being configured to apply the semi-supervised function to the set of data elements associated with the user-selected policy threshold criterion to adjust the boundary of the dataset specification of the set of data elements.

32. A host device, comprising:

a controller comprising a memory and a processor, the controller configured to:

receive a set of data elements from at least one computer environment resource of a computer infrastructure, each data element of the set of data elements relating to an attribute of the at least one computer environment resource;

apply a system analysis function to the set of data elements to characterize a dataset specification associated with the set of data elements;

receive a user-selected policy threshold criterion based on the dataset specification; and adjust a boundary of the dataset specification of the set of data elements, as associated with the user-selected policy threshold criterion, based on a behavioral change of the computer infrastructure, thereby managing attributes of the computer infrastructure;

wherein the controller configured to apply the system analysis function to the set of data elements to characterize the dataset specification associated with the set of data elements comprises the controller being configured to:

apply a clustering function to the each data element of the set of data elements to define a set of clusters, and assign a given dataset specification to each cluster of the set of clusters;

wherein the controller configured to receive the user-selected policy threshold criterion based on the given dataset specification comprises the controller being configured to:

display, via a graphical user interface, the given dataset specification for each cluster of the set of clusters, each given dataset specification associated with a policy threshold criterion; and receive the user-selected policy threshold criterion based on a user-selected dataset specification.

\* \* \* \* \*